United States Patent
Roberts

[11] 3,729,139
[45] Apr. 24, 1973

[54] SEALS
[75] Inventor: Derek Aubrey Roberts, Almondsbury, England
[73] Assignee: The Secretary of State for Defence in Her Britannic Majesty's Government of the United Kingdom of Great Britain and Northern Ireland, London, England
[22] Filed: Sept. 17, 1971
[21] Appl. No.: 181,398

[30] Foreign Application Priority Data
Sept. 26, 1970 Great Britain....................45,976/70

[52] U.S. Cl. ........239/127.3, 239/132.5, 239/265.17
[51] Int. Cl. .............................................B64d 33/04
[58] Field of Search........................239/127.3, 132.5, 239/265.17

[56] References Cited
UNITED STATES PATENTS 2,625,008  1/1953  Crook ...........................239/127.3
3,005,338  10/1961  Libby et al. .......................239/127.3
3,091,924  6/1963  Wilder, Jr..........................239/127.3
3,133,413  5/1964  Lawrence..........................239/127.3
3,303,654  2/1967  Bringer............................239/127.3
3,370,794  2/1968  Drewry et al......................239/127.3
3,467,312  9/1969  Mehr................................239/132.5

Primary Examiner—Lloyd L. King
Attorney—Stevens, Davis, Miller & Mosher

[57] ABSTRACT

A seal clearance is automatically maintained between the mating ends of two ducts the minor one of which is held at a steady temperature by a hot fluid flowing through it. The clearance between the two ducts is maintained by blowing cooling air through apertures in the outer duct which can then escape through the clearance between the two ducts. The size of the clearance therefore controls the cooling airflow through the outer duct which regulates the size of the clearance by controlling the thermal expansion of the outer duct.

6 Claims, 4 Drawing Figures

SEALS

This invention relates to seals and in particular to a seal between a hot duct and a wall surrounding the duct.

A seal for a wall surrounding a hot duct comprises an outer wall element enclosing an inner wall element, a clearance between the wall elements, and means for supplying cooling air to the outer wall element to pass through apertures therein so as to discharge through the clearance, the size of the clearance regulates the airflow and is itself controlled in the matter of thermal expansion by the cooling air.

Constructional forms of the invention will now be described by way of example only with reference to the accompanying drawings, in which.

Figure 1:
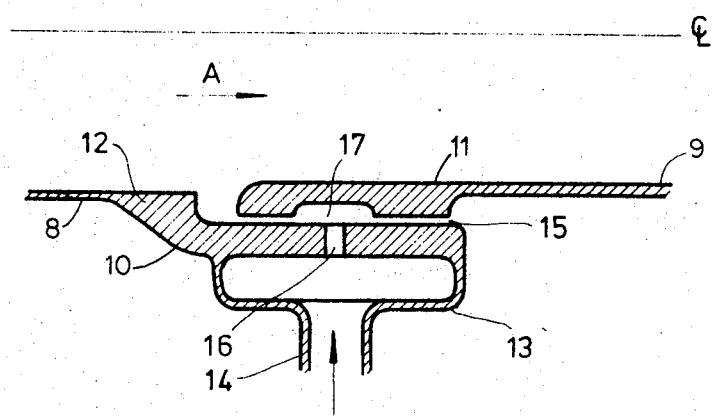
FIG. 1 is a longitudinal section through a jet engine showing the intersection of a jet pipe and a jet nozzle, where the seal is designed to permit the nozzle to move axially with respect to the jet pipe.

Reference to FIG. 1 shows a hot duct in the form of part of the jet pipe 8 of a gas turbine engine the jet pipe being that section of duct aft of the turbine of the gas turbine engine that leads the exhaust gases to the jet nozzle. Hot gases pass in the direction of arrow A and are confined by the jet pipe which has a wall element 12 and a jet nozzle 9 which has a wall element 11. The element 12 surrounds the element 11 to form a seal 10 between the jet pipe and the jet nozzle the two elements being separated by a clearance 15 which is maintained at a small controlled size by means later described.

The inner wall element 11 is maintained at a substantially constant temperature by the hot exhaust gases passing down the jet pipe 8.

A manifold 13 attached to the outer wall element 12 is supplied with cooling air through a pipe 14. This cooling air may be bleed air from the compressor of the gas turbine engine or from any other suitable source. The air passes around the manifold to cool the wall element 12 and passes through a series of holes 16 into a space 17 between elements 11, 12. The air then exhausts through the clearance 15. The flow of cool air is regulated by the size of the clearance at 15.

The magnitude of the clearance depends on the temperature of the wall element 12 and the clearance is increased or decreased due to thermal expansion on raising or lowering the temperature of the wall element 12. The degree of cooling of the outer wall element 12 is dependent on the flow of air through the manifold and this is controlled by the magnitude of the clearance. Hence a situation exists whereby if the temperature of the outer wall increases and thus the clearance, more cooling air flows through the manifold and this tends to lower the temperature of the outer wall.

At a certain point the net heat input to the outer wall will balance the cooling effect and the clearance will settle to a steady value.

A further benefit is derived from the arrangement in that cool air now escapes from the clearance instead of hot air from the jet pipe, thus protecting the surroundings from overheating.

It can be seen from the drawing that freedom of movement of one wall with respect to the other is practical along the direction of the common center line.

Figure 2:
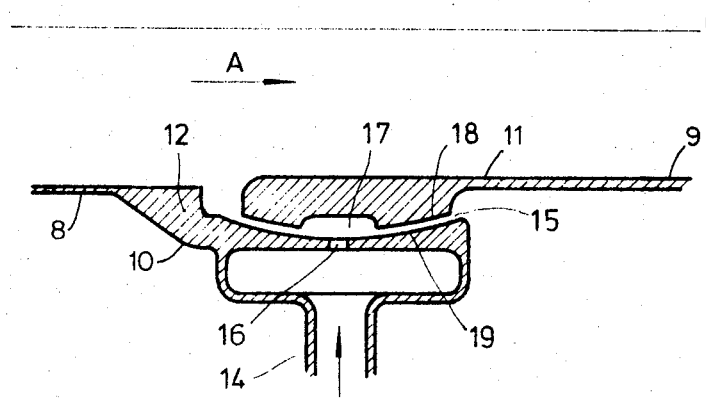
FIG. 2 is a longitudinal section showing a similar joint to FIG. 1 where the seal is designed to permit movement of the jet nozzle about a virtual center situated on the center line of the jet pipe.
Figure 3:
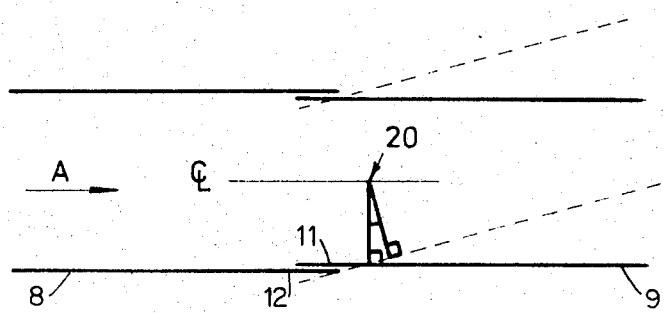
FIG. 3 is a diagrammatic representation of the movement referred to in FIG. 2.

FIG. 2 covers the possibility of misalignment of one of the ducts. Such misalignment may for example arise if the jet pipe and nozzle are mounted separately from each other. The inner wall element 1 is provided with a convex surface 18 to suit its engagement with a concave surface 19 on the outer wall element 12. The rotation detailed in FIG. 3 which illustrates possible angular mismatching of the jet nozzle with the jet pipe is therefore taken care of an effective sealing according to the scheme of FIG. 1 is still possible whilst small rotational movement about a virtual center 20 can be accommodated.

Figure 4:
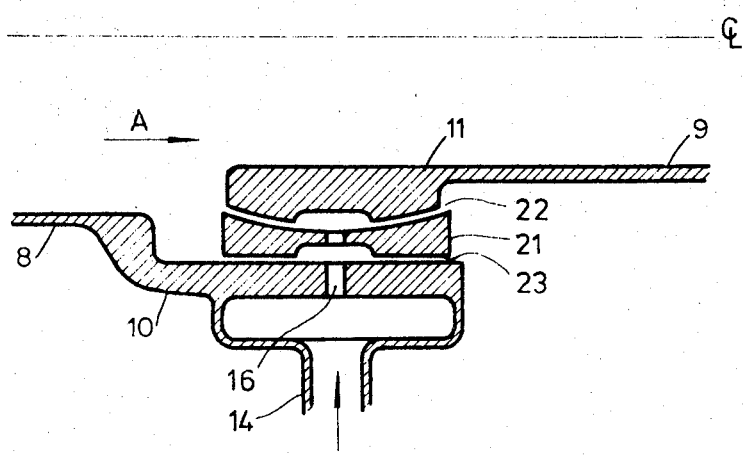
FIG. 4 is a longitudinal section of a seal designed to fulfil the requirements of the seals illustrated in FIGS. 1 and 2.

FIG. 4 shows an arrangement which facilitates both types of movement illustrated in FIGS. 1 and 2. A profiled ring 21 is disposed between the inner wall element 11 and the outer wall element 12. The ring 21 has concave surface 22 on its inside to match a convex surface or element 11, and it has a cylindrical surface 23 on its outside to match a cylindrical surface or element 12.

In this manner surface 23 of the ring and the outer wall element 12 provides a means for taking up relative axial displacement of the two ducts. The concave side of the ring 22 and the inner wall element 11 take account of the misalignment referred to under FIG. 2.

What I claim is:

1. A seal for a wall surrounding a hot duct comprising an outer wall element enclosing an inner wall element, a clearance between the wall elements, means defining apertures in the outer wall element, means supplying cooling air to the outer wall element to pass through the apertures therein so as to discharge through the clearance, and wherein the size of the clearance regulates the air flow and is itself controlled in the matter of thermal expansion by the cooling air.

2. A seal according to claim 1 wherein the wall is a jet nozzle and the hot duct is a jet pipe and wherein the jet nozzle is free to move axially with respect to the jet pipe.

3. A seal according to claim 1 wherein the wall is a jet nozzle and the hot duct is a jet pipe and wherein the jet nozzle is free to move about a virtual center situated on the center line of the jet pipe.

4. A seal according to claim 1 wherein the wall is a jet nozzle and the hot duct is a jet pipe and wherein the jet nozzle is free to move both axially with respect to the jet pipe and about a virtual center situated on the center line of the jet pipe.

5. A seal according to claim 4 wherein a ring is disposed between the jet nozzle and the jet pipe, the ring having radially inner and outer surfaces, profiled to match corresponding surfaces on the jet nozzle and the jet pipe.

6. A seal according to claim 5 wherein one said surface is flat to accommodate axial movement and the other said surface is concave to accommodate said movement about a virtual center situated on the center line of the jet pipe.

* * * * *